United States Patent Office 3,345,854
Patented Oct. 10, 1967

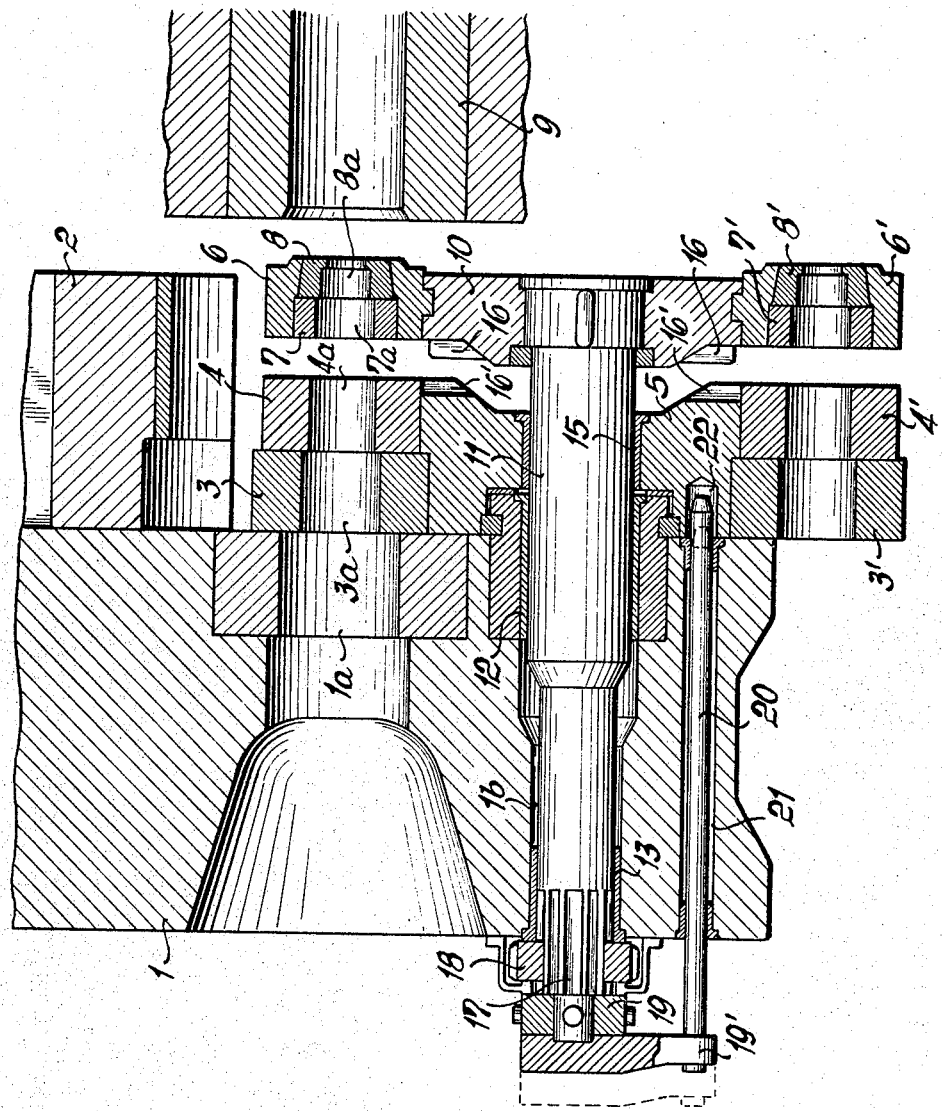

3,345,854
EXTRUDER HAVING MEANS FOR EXCHANGING PRESSURE PLATES AND DIES
Johann Gross, Duisburg, Germany, assignor to Hydraulik G.m.b.H., Duisburg, Germany
Filed Nov. 2, 1965, Ser. No. 506,039
Claims priority, application Germany, Nov. 7, 1964, H 54,245
5 Claims. (Cl. 72—263)

ABSTRACT OF THE DISCLOSURE

An extruder having exchangeable pressure plates and die plates operates in conjunction with a receiver which may be axially displaced toward and away from the discharge opening of the extruder. The apparatus includes a shaft upon which a first carrier arm is freely rotatable in a position such that it may orient a selected one of a group of pressure plates which are located on at least two diametrically opposite portions of the arm in association with the discharge of the extruder. In addition, a second carrier arm carries a similar number of die holders and dies which are located on at least two diametrically opposite portions of the second carrier arm which is affixed to the shaft for rotation therewith. The first carrier arm which is freely rotatable on the shaft may be displaced axially relative to the first carrier arm which is affixed to the shaft. The shaft may be moved inwardly to cause engagement of the second carrier arm with the first carrier arm and the interengagement of coupling elements thereon to cause rotation of the first carrier arm with the second carrier arm when the shaft is rotated. The arrangement also includes a coupling rod member 20 which is moved into a recess of the first carrier arm to hold it against rotation when the first and second carrier arms are separated and upon rotation of the shaft upon which the arms are mounted.

The construction is particularly important because the dies are changed much more frequently than the pressure plates so that the carrier arms with the pressure plates need not rotate with the shaft during its normal operation but can be connected thereto for rotation therewith to change the pressure dies only in those instances when it is necessary.

---

This invention relates, in general, to extruders and, in particular, to a new and useful extruder having a selectively interchangeable press die and intermediate pressure piece.

The present invention is particularly applicable for use in an extruder of the type in which the receiver is mounted for movement relative to the extruder. The present invention is an improvement over the prior art, particularly in respect to the means for mounting an extruder die and an intermediate pressure piece on separate rotatable arms or carriers which are carried by a displaceable shaft member. It has been discovered, in accordance with the invention, that the rotating arm for the die must be displaced axially away from the extruder in order to permit the residue to be severed from the extruded part at a location between the die and the receiver after the extrusion takes place.

In accordance with the invention, there is provided an extruder construction in which one or more pressure pieces are oriented adjacent the opening for the extruder and they are mounted on a carrier rotatably carried on a shaft so that they may be exchanged with similar pieces carried on the same carrier. In addition, a second rotatable carrier or arm member having a plurality of different pressure dies is fixed to the same shaft and is rotatable therewith at a position alongside the first member. The shaft may be moved longitudinally to separate the two members are brought together so that the two members interengage and move, i.e. rotate, simultaneously. In the preferred arrangement, the shaft may be rotated by means of a gear fixed thereto for the purpose of shifting either the intermediate pressure piece or the pressure die or both. In addition, the shaft may be displaced axially by a power drive connection in order to separate the two members bearing the respective intermediate pressure piece and the pressure die, respectively. A feature of the construction is that it is not necessary to rotate both of the members when only the pressure die is to be exchanged. For this purpose, a controllable coupling is provided which is displaceable axially with the shaft carrying the two members and which will engage and hold the member carrying the pressure piece so that it will not rotate with the shaft when only the member carrying the pressure die is to be rotated. The coupling is advantageously set to work after the member carrying the die is separated or moved or displaced axially away from the member carrying only the pressure piece. When the two members are moved axially together, however, they have portions which interengage so that further rotation of the shaft upon which they are supported is effective to rotate both.

Accordingly, it is an object of the invention to provide an extruder having a first member carrying a plurality of selective pressure pieces and a second member carrying a plurality of pressure dies, with means rotatably mounting said members in connection with the opening of an extruder permitting selective orientation of a pressure die and a pressure piece in respect to the opening.

A further feature of the invention is to provide an extruder having interchangeable pressure pieces at dies with a carrier separately carrying the pressure piece and the die which carriers may be interengaged for combined movement and replacement of both pressure piece and die, or separated for movement only of the carrier carrying the pressure die.

A further object of the invention is to provide an extruder which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

The only figure of the drawings is a somewhat schematic longitudinal sectional view of an extruder constructed in accordance with the invention.

Referring to the drawing, in particular, the invention embodied therein comprises a main extruder body 1 having a discharge opening 1a for discharging material to be extruded into a receiver 9.

In accordance with the invention, the extruder is provided with a bore 1b in which a carrying shaft 11 is rotatably and axially displaceable. The shaft 11 is rotatable and axially displaceably mounted on bushings 12 and 13 carried at opposite ends of the bore 1b of the body 1.

In accordance with the invention, a first carrier or arm member 5 is rotatable on a bushing 15 which is positioned around the shaft 11. The first carrier member 5 provides a mounting for at least two sets of intermediate pressure plates 3, 4 and 3' and 4'. As indicated in the drawing, the carrier 5 is positioned so that the bores 3a and 4a of the intermediate pressure pieces 3 and 4, respectively, are aligned with the opening 1a of the extruder.

A second carrier member or arm member 10 for a plurality of pressure dies is affixed to the outer end of a shaft 11. The second carrier member 10 carries exchangeable die holders 6 and 6' having a die 8 with a rear bearing 7, and die 8' and rear bearings 7', respectively.

In the operating position of the extruder, the second carrier 10 is moved toward the first carrier 5 so that the rear bearing 7 is oriented with its bore 7a in alignment with the bore 4a and the receiver 9 is pressed against the outer end of the die holder 6 so that the bore thereof is aligned with the bore 8a of the die 8. A cross bar for rotating arm 5 and 10 is designated by the numeral 2.

The second carrier 10 is axially fixed on the shaft 11 so that when the shaft 11 is displaced to the left as indicated in the drawing a follower portion or gear-like projection 16 will engage with a similar projection or indentation follower portion 16' defined on the first carrier member 5 so that any subsequent rotation of the shaft member will effect the rotation of first and second carrier members 5 and 10. In order that the shaft 11 may be rotated, there is affixed thereto a gear 18 which is mounted on splines 17 for axial displacement in respect to the shaft. The gear 18 is driven by gears (not shown) operated by a control for rotating the shaft 11 as desired. Additional means (not shown) are provided for displacing the shaft axially in a selected direction. These means are located on the rear portion of the shaft adjacent the pinion 18.

In accordance with a feature of the invention, the shaft 11 may be rotated when the parts are in the position indicated in the drawing in order to replace the pressure die 6 with the pressure die 6'. Such rotation will not affect the positioning of the first carrier member 5, but will only rotate the second carrier member 10. Upon axial displacement of the shaft 11 to the left to bring the second carrier member 10 into juxtaposition with the first carrier member 5, the couplings 16 and 16' are interengaged. Thereafter rotation of the shaft 11 will effect the combined rotation of the first and second carrier members 5 and 10. The rotation of this first carrier member 5 is facilitated by the disengagement of a rod coupling member 20 from a receiving bore 22 defined in the side face of the first carrier member 5. The rod 20 is carried on a lever arm member 19' which is affixed to the end of the shaft 11 on a ring 19 secured thereto. In the position shown in the drawing, the rod 20 projects into the bore 22 defined on the first carrier member 5 and holds the latter so that it will not rotate when the shaft 11 is rotated.

During extrusion the parts 3, 4, 7, 8 and 9 are superposed. When the material is extruded, the receiver 9 is first brought into the position indicated in the drawing. Then the rotating arm 10 which is carried on the shaft 11 is moved by the longitudinal displacement of the shaft 11 so that the die holder 6 is moved toward the receiver 9 to the position indicated in the drawing as the shaft 11 is displaced axially to the right, the bar 20 is moved into the bore 22 of the rotating carrier member 5. Then in order to exchange the die 8 and the rear bearings 7 and die holder 6 with a new die holder 6', die 8' and rear bearings 7', it is necessary to rotate the shaft 11 by driving the pinion 18. Because the first carrier member 5 is locked by the bar 20, it is prevented from turning with the shaft 11.

When the intermediate pieces 3 and 4 are also to be exchanged, the shaft 11 is returned to the operating or extruding position to cause engagement of the coupling elements 16 and 16' on the carrier members 10 and 5, respectively. Thereafter rotation of the shaft 11 will effect rotation of both the first and second carrier members because the bar member 20 has been moved out of the engagement within the groove 2 by the displacement of the shaft 11.

When the extrusion does not have to be separated from the residue behind the die 8 but must be separated before the die shearing, the carrier shaft 11 is not displaced longitudinally. The carrier shaft 11 then assumes the base position and the bar 20 is not located within the recess 22 of the carrier member 5. In this position, both the first and second carrier members 5 and 10 can be rotated away from the extrusion opening 1a.

In some instances, it is preferable to provide a brake for a locking device for the first carrier member 5. In such a case, one or more spring members are connected with the carrier shaft 11 and act, for example, on the rotating carrier member 5 to prevent its rotation.

While a specific embodiment of the invention has been shown and described in detail to illustrate the application of the inventive principles, it will be understood that the invention may be embodied otherwise without departing from such principles.

What is claimed is:

1. An extruder comprising an extruder body having an opening through which material is extruded, a rotatable shaft adjacent said extruder body, a first axially movable carrier arm freely rotatable on said shaft and having a plurality of exchangeable intermediate pressure pieces thereon arranged in circumferentially spaced relationship, a second carrier arm affixed to said shaft for rotation thereby and disposed alongside said first movable carrier arm and having a plurality of exchangeable pressure dies thereon arranged in circumferentially spaced relationship, interengageable coupling means defined on said first and second carrier arms engageable when said first and second carrier arms are substantially abutting and disengageable when they are separated by relative axial movement of said first carrier arm in respect to said shaft, and locking and releasing means for holding said first carrier in a stationary position at which it is spaced axially from said second carrier to prevent its rotation with said shaft and for displacing said first carrier toward said second carrier to interengage said first carrier with said second carrier and to release said first carrier to permit rotation of said first carrier with said second carrier and said shaft.

2. An extuder comprising axially displaceable receiver means, an extruder body arranged adjacent said receiver means for extruding materials through a plurality of pressure plates and dies through said receiver means, a shaft rotatably and axially displaceable mounted adjacent said extruder body and extending substantially parallel to the axis of said extruder body discharge, a first rotating arm having a pressure piece at least two circumferentially spaced locations thereon and being freely rotatable on said shaft, a second rotating arm having at least two circumferentially spaced dies thereon affixed to said shaft for rotation therewith, and means operatively associated with said first and second arms for selectively connecting said arms for rotation together with said shaft and for locking said first arm to prevent rotation thereof upon rotation of said shaft.

3. An extruder, according to claim 1, including a pinion connected to said shaft for rotating said shaft for selectively displacing said first and second carrier arms for the purpose of orienting said intermediate pressure pieces and said pressure die with the opening of said extruder.

4. An extruder, according to claim 1, wherein said shaft is rotatably and axially displaceably mounted in said interengageable means of said body, said first and second carrier arms having interengageable coupling portions on each of said first and second carrier arms which interengage when said first and second carrier arms are moved together by displacement of said shaft relative to said said first carrier arm.

5. An extruder, according to claim 4, wherein said locking means include a coupling connected to said shaft and engageable with said first carrier to hold said first carrier against rotation, said coupling being displaceable out of engagement with said first carrier member when said second carrier member is moved into juxtaposition with said first carrier member and interengaged therewith.

References Cited

UNITED STATES PATENTS

| | | | |
|---|---|---|---|
| 2,915,957 | 12/1959 | Bowman | 18—12 XR |
| 3,119,493 | 1/1964 | Zilges | 72—263 |
| 3,130,468 | 4/1964 | McFall | 18—12 XR |

FOREIGN PATENTS

| | | |
|---|---|---|
| 765,383 | 1/1957 | Great Britain. |
| 625,983 | 9/1961 | Italy. |

WILLIAM J. STEPHENSON, *Primary Examiner.*